G. A. SAGENDORPH.
FASTENER FOR METAL LATH.
APPLICATION FILED OCT. 19, 1911.
1,068,081.
Patented July 22, 1913.
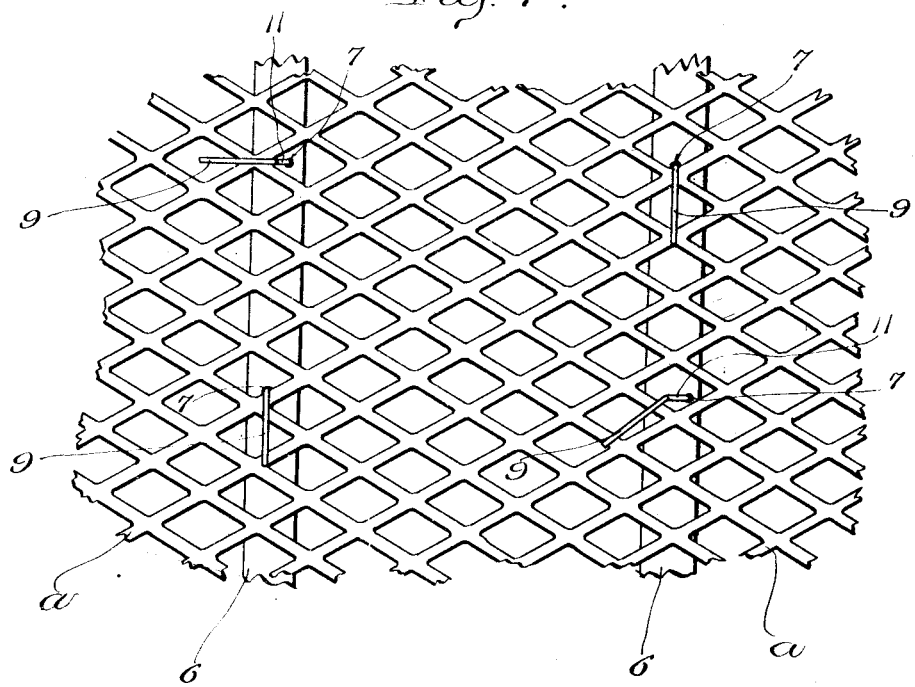
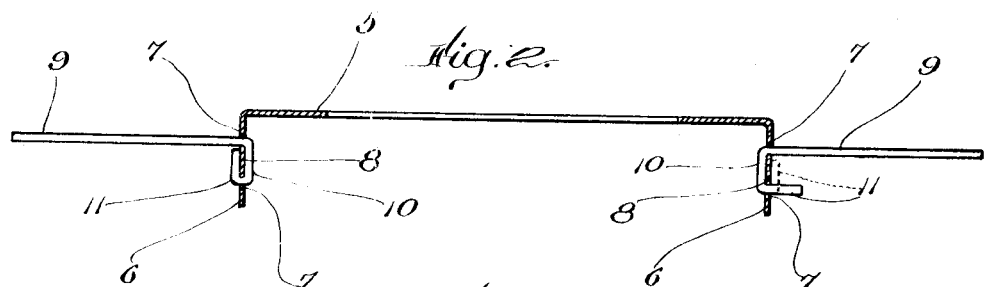
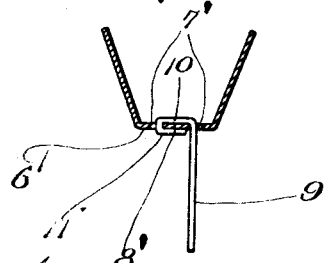
Witnesses:
Lucius B. Weymouth.
M. F. McKay.
Inventor:
George A. Sagendorph
By Henry J. Miller
atty.

UNITED STATES PATENT OFFICE.

GEORGE A. SAGENDORPH, OF BROOKLINE, MASSACHUSETTS.

FASTENER FOR METAL LATH.

1,068,081.  Specification of Letters Patent.  Patented July 22, 1913.

Application filed October 19, 1911. Serial No. 655,632.

*To all whom it may concern:*

Be it known that I, GEORGE A. SAGENDORPH, of Brookline, in the county of Norfolk and State of Massachusetts, have invented a new and useful Improvement in Fasteners for Metal Lath, of which the following is a specification, reference being had to the accompanying drawings, forming part thereof.

This invention has reference to improvements in devices for securing metal lath or similar structures to sheet metal studs of various kinds.

The object of the invention is to provide a sheet metal stud or frame with a simple and efficient fastening device by means of which metal lath or metal plates may be secured to said stud or frame.

The invention consists in the combination with a sheet metal stud or frame of the novel fastening member extending through a perforation in said stud or frame and having a bent terminal by which both surfaces of the stud or frame are grasped.

The invention also consists in such other novel features of construction and combination of parts as shall hereinafter be more fully described and pointed out in the claim.

Figure 1, represents a front view of portions of two studs or frames provided with the new fastener and a piece of metal lath secured to such studs or frames by such fasteners. Fig. 2, represents a cross sectional view of an open center metallic stud provided with the new fastener. Fig. 3, represents a similar view of a wall stud showing the new fastener attached thereto.

Similar numerals of reference designate corresponding parts throughout.

In carrying this invention into practice, I take a sheet metal stud or frame 5 having one or more plates or lips 6, 6 to which the metal lath or similar structure A is intended eventually to be secured, and I provide said member 6, at suitable intervals with pairs of perforations 7, 7 whereby the web 8 is formed within the area of the plate, lip or member 6. I next take the lath fastener made of bendable wire and having the parallel members 9 and 11, connected by the integral cross member 10. The end of the member 9 is first passed through one of a pair of the perforations 7, 7 and, ultimately the end of the member 11 is passed through the other of the pair of said perforations and the cross member 9 is brought to bear against the back of web 8 of the stud plate or lip 6, as shown in full lines at the right hand side of Fig. 2, the member 11 is now bent down toward the member 9 until said member 11 bears against the web 8 as indicated in dotted lines at the right hand side of said Fig. 2, and shown elsewhere in the drawings in full lines. As the distance between the members 9 and 11 is such that these members fit closely against the web 8 of metal between the perforations 7, 7 the bending of the member 11 toward the member 9 tends to draw the base portions of member 9 against the edge of its perforation 7 so that those portions of the members 9 and 11 which extend through the pair of perforations 7, 7 are intimately engaged with the edges of said pair of perforations, or with the edge of the web 8 and the result of the continued bending downward of member 11, until its end touches or approximately touches the member 9 is to clamp the web 8 of material, formed between the perforations 7, 7 between said members 10 and 11 whereby the base portion of the member 9 is rigidly secured to the plate or lip 6, and the main portion of member 9 stands outward.

In Fig. 3 the wall stud has the plate or member 6' furnished with the pair of perforations 7', 7', whereby the web 8' of material is formed therebetween, the fastener being of the same construction and secured in the same manner as that described with reference to Figs. 1 and 2 of the drawing.

Studs or frames having fasteners secured thereto as above described are placed in position and metal lath A, or material having openings to receive the outstanding members 9, 9 of the fastening devices, is placed against said studs, the members extending through the holes in said material. The extending portions of the members 9, 9 are then bent down toward the lath or material A as shown in Fig. 1 and thus secure said material in place.

The studs or frames are, in practice, of sheet steel and are comparatively hard, while the bendable wire fastenings which are to attach the metal lath to the said studs or frames are, in practice, comparatively soft, being preferably of malleable iron, so that they can be readily attached at one end, as shown, to the said studs or frames, and can be easily bent over to secure the metal lath in place without straining or distorting the said studs or frames.

Having thus described my invention I claim as new and desire to secure by Letters Patent.

A metal lath supporting and fastening device consisting of a sheet metal stud or frame, of relatively hard metal and having pairs of perforations or spaced openings, said stud or frame being provided with fastening wires of relatively soft metal, said fastening wires each comprising a U-shaped end portion, the arms of the U passing through a pair of said spaced openings, and one arm of said U being bent against the stud or frame, whereby said wires are each attached at one end to said stud or frame leaving their free ends projecting outward from the said stud or frame so that said free ends may pass through the metal lath and may then be bent over to secure the said lath in place.

GEORGE A. SAGENDORPH.

Witnesses:
HENRY J. MILLER,
M. F. McKAY.